United States Patent
Dow et al.

(10) Patent No.: US 9,992,204 B2
(45) Date of Patent: *Jun. 5, 2018

(54) VIRTUAL MACHINE ACCESS CONTROL IN MOBILE COMPUTING DEVICE BASED ON POSITIONAL RANGE FROM BEACON SIGNAL

(71) Applicant: International Business Machines Corporation, Armonk, NY (US)

(72) Inventors: Eli M. Dow, Poughkeepsie, NY (US); Douglas E. Rohde, East Meadow, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 223 days.

This patent is subject to a terminal disclaimer.

(21) Appl. No.: 14/705,465

(22) Filed: May 6, 2015

(65) Prior Publication Data

US 2016/0328255 A1 Nov. 10, 2016

(51) Int. Cl.
*H04L 29/06* (2006.01)
*G06F 9/455* (2018.01)
(Continued)

(52) U.S. Cl.
CPC .............. *H04L 63/102* (2013.01); *G06F 8/61* (2013.01); *G06F 8/65* (2013.01); *G06F 9/45558* (2013.01); *G06F 21/6218* (2013.01); *G06F 21/88* (2013.01); *H04L 9/0816* (2013.01); *G06F 2009/4557* (2013.01); *G06F 2009/45575* (2013.01); *G06F 2009/45587* (2013.01);

(Continued)

(58) Field of Classification Search
CPC .......... G06F 9/45558; G06F 8/61; G06F 8/65; H04L 9/0816; H04L 63/102
See application file for complete search history.

(56) References Cited

U.S. PATENT DOCUMENTS 8,275,356 B2  9/2012  Hickie
2008/0234004 A1* 9/2008  Loque ............... H04L 29/12188
                                                                455/564

(Continued)

FOREIGN PATENT DOCUMENTS

EP    1605674 A1    12/2005
EP    1889460 A1     2/2008
EP    2506146       10/2012

OTHER PUBLICATIONS

List of IBM Patents or Patent Applications Treated as Related; (Appendix P), Filed Sep. 14, 2015; 2 pages.

(Continued)

*Primary Examiner* — James J Lee (74) *Attorney, Agent, or Firm* — Cantor Colburn LLP; Steven Chiu (57) ABSTRACT

A system is provided and includes a broadcasting device configured to emit a beacon signal over a predefined range and a mobile computing device. The mobile computing device is configured to run a host operating system at any location. The mobile computing device is further configured to run a virtual machine associated with the beacon signal within the host operating system but only when the computing device is in range of the beacon signal of a predefined strength.

12 Claims, 4 Drawing Sheets

(51) Int. Cl.
  *G06F 21/62* (2013.01)
  *G06F 9/445* (2018.01)
  *H04L 9/08* (2006.01)
  *G06F 21/88* (2013.01)

(52) U.S. Cl.
  CPC .............. *G06F 2009/45595* (2013.01); *G06F 2221/2111* (2013.01)

(56) References Cited

U.S. PATENT DOCUMENTS

| | | | |
|---|---|---|---|
| 2010/0211698 A1* | 8/2010 | Krishnaswamy | H04W 4/003 710/11 |
| 2010/0293543 A1 | 11/2010 | Erhart | |
| 2012/0046040 A1 | 2/2012 | Chatterjee | |
| 2013/0019321 A1 | 1/2013 | Ferren | |
| 2013/0074067 A1* | 3/2013 | Chowdhry | G06F 21/74 718/1 |
| 2013/0086202 A1* | 4/2013 | Connelly | H04L 67/10 709/217 |
| 2013/0254831 A1 | 9/2013 | Roach et al. | |
| 2015/0100152 A1* | 4/2015 | Barragan Trevino | G06Q 20/322 700/232 |
| 2016/0099972 A1 | 4/2016 | Qureshi et al. | |
| 2016/0241702 A1* | 8/2016 | Gorajala Chandra | H04M 1/72533 |
| 2017/0048204 A9 | 2/2017 | Barton et al. | |

OTHER PUBLICATIONS

Eli M. Dow et al., "Virtual Machine Access Control", U.S. Appl. No. 14/853,562, filed Sep. 14, 2015.

\* cited by examiner

VIRTUAL MACHINE ACCESS CONTROL IN MOBILE COMPUTING DEVICE BASED ON POSITIONAL RANGE FROM BEACON SIGNAL

BACKGROUND

The present invention relates to virtual machines, and more specifically, to virtual machine access controls.

With mobile virtualization and the movement to "bring your own device" (BYOD) computing, mobile phones, tablets, laptops or other mobile devices can run a plurality of virtual machines whereby each of the virtual machines on a given device is contextualized for different roles or personas (e.g., a personal persona and a corporate persona). In such cases, aspects of a user interface of a particular mobile device will include the interface layout, context independent data, such as certain contact entries and device identification and ownership data that can be viewed in accordance with any persona at any given time, and context dependent data. Such context dependent data would be available only in accordance with the persona corresponding to the context dependent data being used at a given time.

As such, where a mobile device has a host operating system and one or more virtual machines installed to run within the host operating system, it is often important to ensure that those virtual machines are secured or otherwise not privy to security vulnerabilities. For example, a mobile tablet may be brought home by an individual who works for a given corporation and the tablet may have a store-bought operating system and a virtual machine that allows the individual to conduct his corporate business at corporate headquarters or his house. In such a case, even if the individual might log out of sensitive corporate applications at his house, he might not completely turn off the virtual machine. If he then hands the tablet to a child and the child accidentally visits a website containing malware, this malware could obtain access to sensitive corporate information.

SUMMARY

According to one embodiment of the present invention, a computer-implemented method of operating a mobile computing device is provided. The method includes receiving, via a networking unit of the computing device, a beacon signal only upon the computing device entering within a range of the beacon signal, determining that a virtual machine associated with the beacon signal exists in the computing device and running an instance of the virtual machine on the computing device using a component of the beacon signal while the computing device remains within the range of the beacon signal of a predefined strength.

According to another embodiment, a system is provided and includes a mobile computing device. The mobile computing device includes a memory having computer readable instructions and one or more processors for executing the computer readable instructions. The computer readable instructions are configured to instruct the one or more processors to run a host operating system at any location and to run a virtual machine within the host operating system only when the mobile computing device is in within a predefined positional range.

According to another embodiment, a mobile computing device usable with a broadcasted network is provided. The broadcasted network includes a broadcasting device that emits a beacon signal associated with a virtual machine. The mobile computing device includes a networking unit that is receptive of the beacon signal when the computing device is in a broadcast range of the broadcasting device, a processing unit coupled to the networking unit and a memory unit having executable instructions stored thereon. When executed, the executable instructions cause the processing unit to run a host operating system and an instance of the virtual machine within the host operating system but only when the computing device is in the broadcast range of the broadcasting device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As will be described below, a system is provided that makes it unlikely for a user to "forget" to log out of a virtual machine profile when switching roles. The system allows for management and installation of multiple virtual machines with respect to devices within various networks as well as automatic or semi-automatic switching of these virtual machines based upon when a user comes in range of a beacon relating to a particular virtual machine that is to be run on his device. In accordance with and embodiment of the system, as the user's distance from the beacon increases, the device will begin to switch back to the device's original operating system or virtual machine. In order to limit access to these location-based virtual machines, the system uses mobile device firmware to passively scan for a signal beacon (e.g., a wifi, a GPS signal or another broadcast system) that uses the presence or absence of this signal and possibly the signal strength to ensure a user is within the network region considered appropriate for that role.

Figure 1:
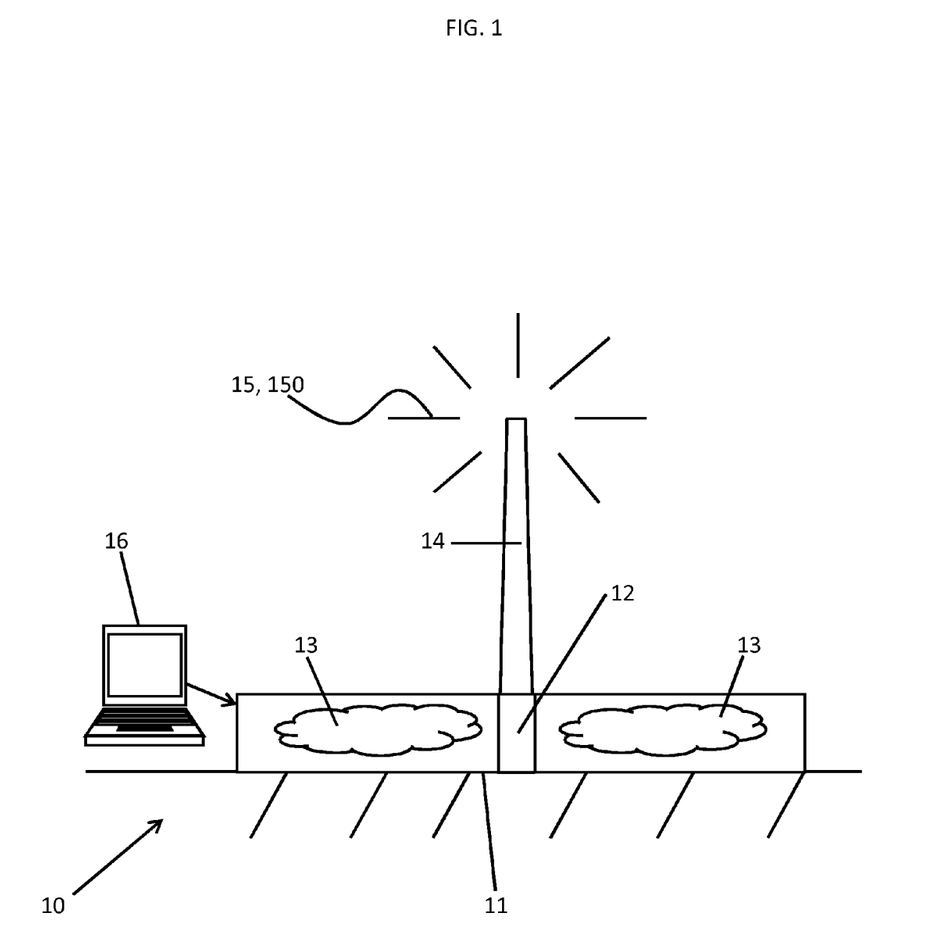
FIG. 1 is a schematic illustration of a system in accordance with embodiments of the invention.

With reference to FIG. 1, a system 10 is provided for a given campus 11 and includes a central system server 12 that hosts a given, secure network 13 that is broadcasted or otherwise available throughout at least a portion of the campus 11 by various devices, such as ethernet ports, modems, wifi emitters, etc., for accessibility by only authorized users. The system 10 further includes a broadcasting device 14 that is disposed within the campus and configured to emit a beacon signal 15 over a predefined range that is related to both a predefined strength of the signal and a desired range for access to the network 13 and a mobile computing device 16. The predefined range of the beacon signal 15 may be, but is not required to be, limited to the portion of the campus 11 to which the network 13 is broadcasted. The mobile computing device 16 can be any mobile computer, such as a smartphone, a tablet or a laptop, and is configured to run an instance of a virtual machine associated with the network 13 as will be described below.

Figure 2:
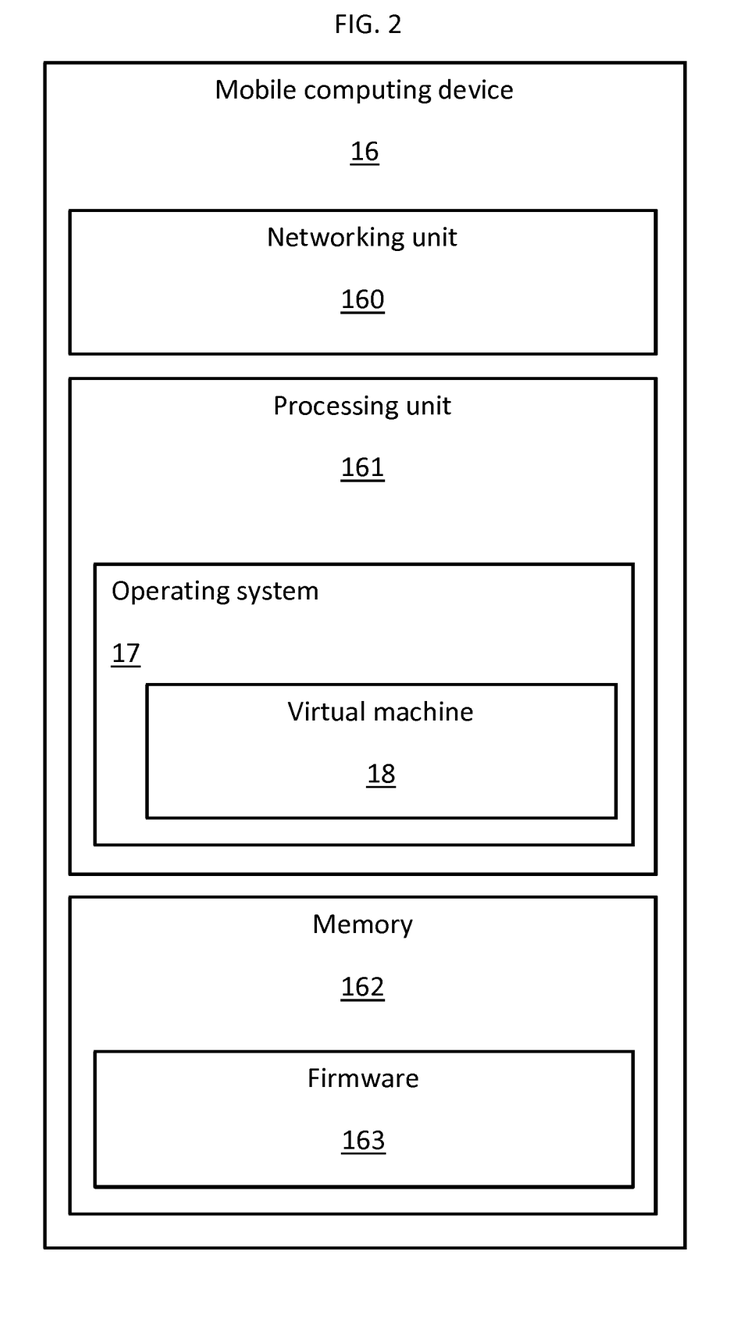
FIG. 2 is a schematic illustration of a mobile computing device for use with the system of FIG. 1.

With reference to FIG. 2, the mobile computing device 16 is usable and communicative with the broadcasted network 13. To this end, the mobile computing device 16 includes a networking unit 160, one or more processors (hereinafter referred to as "a processing unit 161") coupled to the networking unit 160 and a memory unit 162. The networking unit 160 may be provided as any networking hardware and/or an antenna and is receptive of the beacon signal 15 when the mobile computing device 16 is in the broadcast range of the broadcasting device 14. That is, the networking unit 160 is receptive of the beacon signal 15 only when the mobile computing device 160 is in the portion of the campus 11 to which the network 13 is broadcasted or otherwise available.

The memory unit 162 includes firmware 163 and has executable instructions stored thereon, which, when executed, cause the processing unit 161 to run a host operating system 17 and an instance 18 of a virtual machine within the host operating system 18. Both the host operating system 17 and the instructions for running the instance 18 of the virtual machine reside in the firmware 163. Where the virtual machine is associated with the network 13, the running of the instance 18 of the virtual machine by the processing unit 161 is permitted only when the mobile computing device 16 is in the broadcast range of the broadcasting device 14.

Although the description provided herein refers to the mobile computing device 16 running only a host operating system 17 and an instance 18 of a virtual machine, it will be understood that the mobile computing device 16 can run multiple operating systems and multiple virtual machines by way of a hypervisor residing in the firmware 163. The example of the mobile computing device 16 only running the single host operating system 17 and the single instance 18 of the virtual machine is provided for clarity and brevity and is merely exemplary.

Figure 3:
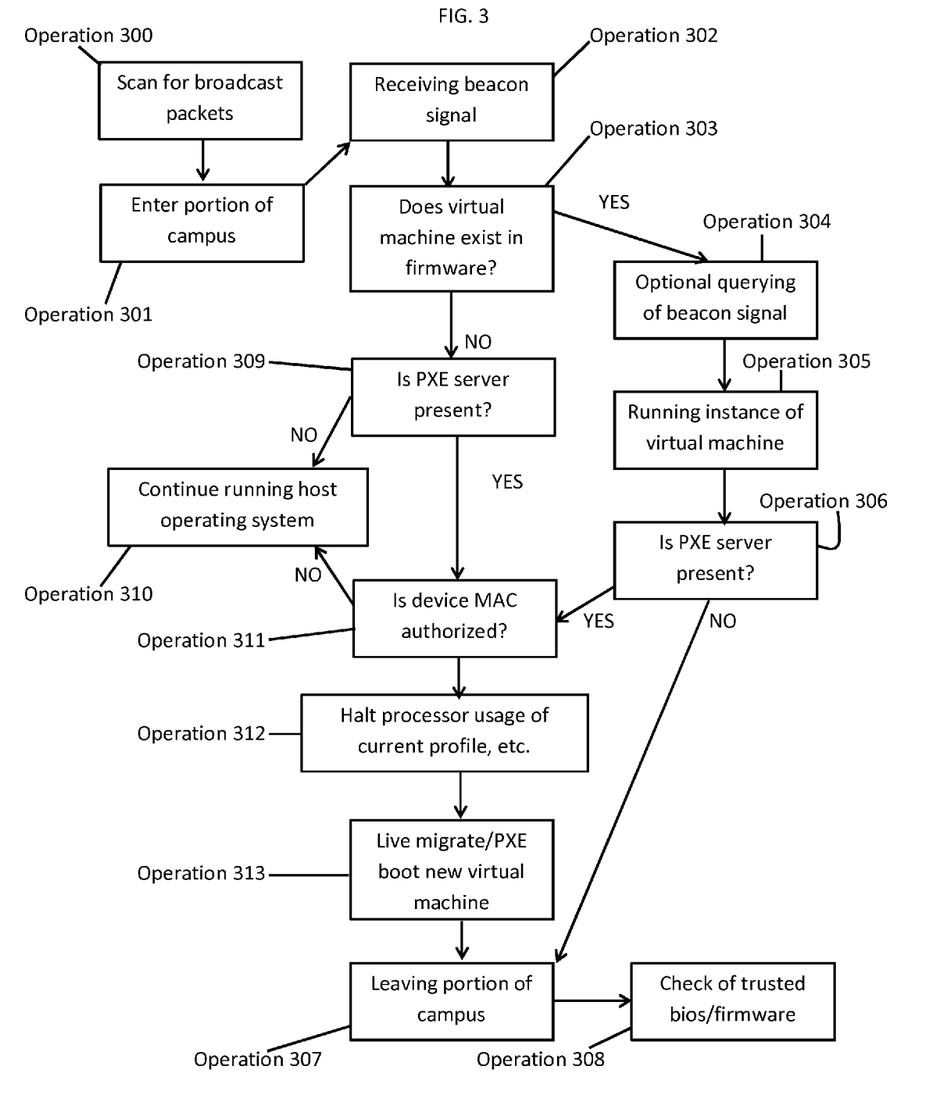
FIG. 3 is a flow diagram illustrating a method of operating the mobile device of FIG. 2.

With reference now to FIG. 3, a method of operating the mobile computing device 16 is provided. The method is generally executed by the processing unit 161 and the networking unit 160 under the control of the processing unit 161 and in accordance with the executable instructions stored in the memory unit 162 such that the processing unit initially runs the host operating system 17.

The method initially includes conducting, by way of the networking unit 160, a continuous, semi-continuous or user initiated scan for broadcast packets of the network 13 (operation 300) and either an entering of at least the portion of the campus 11 to which the network 13 is broadcast or an approach toward the broadcasting device 14 of the beacon signal 15 by a user and the mobile device 16 (operation 301).

In any case, once and only once the mobile device 16 is in range of the beacon signal 15 whereby the networking unit 161 can receive the beacon signal 15, the method next includes receiving, via the networking unit 161, the beacon signal 15 (operation 302) and a determination of whether a virtual machine associated with the beacon signal 15 exists in the firmware 163 (operation 303). In accordance with embodiments, the determination of operation 303 may be conducted by a checking or reading of the firmware 163 to confirm or validate an existence of the instructions for running the virtual machine associated with the beacon signal 15 in the firmware 163 or any other part of the memory unit 162.

In an event that the determination of operation 303 reveals that the instructions for running the virtual machine associated with the beacon signal 15 exist in the firmware 163 or any other part of the memory unit 162, the method further includes an optional querying of the beacon signal 15 that the user can access the virtual machine (operation 304) and the running of the instance 18 of the virtual machine on the mobile computing device 16 (operation 305). In accordance with embodiments, the running of the instance 18 of the virtual machine may involve the pulling of the name of the virtual machine from the firmware 163 to unlock the virtual machine and the use of a component of the beacon signal 15 while the mobile computing device 16 remains within the range of the beacon signal 15 as a precondition to decryption of the unlocked virtual machine.

This beacon signal component may include, for example, a private key 150 (see FIG. 1) that is transmittable by the broadcasting device 14 along with the beacon signal 15. In accordance with embodiments, the private key 150 may include an enterprise wireless end point (WEP) key.

Once the running of the instance 18 of the virtual machine of operation 305 commences, the method may include a checking or determination as to whether a virtual machine or operating system instance provisioning server 19 (see FIG. 1) of the system 10 is present, communicative or otherwise proximate to the networking unit 160 and a further determination as to whether a version of the virtual machine exists on that virtual machine or operating system instance provisioning server 19 that is a later version than the version of the virtual machine of the instance 18 (operation 306). The virtual machine or operating system instance provisioning server 19 may, in some cases, provide the functionality offered by a pixie (PXE) server.

In an event that operation 306 reveals that no virtual machine or operating system instance provisioning server 19 is found or that any version of the virtual machine on a virtual machine or operating system instance provisioning server 19 is not a later version than the version of the virtual machine of the instance 18, the method includes continued running of the instance 18 of the virtual machine until the mobile computing device 16 is brought out of range of the beacon signal 15 by the user (operation 307).

Once the mobile computing device 16 is out of the range of the beacon signal 15 or approaches a range limit such that strength of the beacon signal 15 is reduced below a predefined threshold, the processing unit 161 checks trusted bios or the firmware 163 for instructions on how to handle or otherwise process the running of the instance 18 of the virtual machine (operation 308) upon the mobile computing device 160 leaving the range of the beacon signal 15. In accordance with embodiments, these instructions may refer to storing or automatically suspending and encrypting the instance 18 until the mobile computing device 160 is returned to within the range of the beacon signal 15 or the storing and/or destruction of the instance 18.

In an event that the determination of operation 303 reveals that the instructions for running the virtual machine associated with the beacon signal 15 do not exist in the firmware 163 or any other part of the memory unit 162, the method further includes a checking or determination as to whether the virtual machine or operating system instance provisioning server 19 (see FIG. 1) of the system 10 is present, communicative or otherwise proximate to the networking unit 160 (operation 309). In an event that no virtual machine or operating system instance provisioning server 19 is found, the processing unit 161 continues running the host operating system 17 (operation 310). Conversely, in an event that the virtual machine or operating system instance provisioning server 19 is found, the method includes a determination of whether data or a data packet exists remotely (e.g., in the virtual machine or operating system instance provisioning server 19) from the mobile computing device 16 or if the mobile computing device 16 itself includes data or a data packet storable in the memory unit 162 to identify whether the mobile computing device 16 as being authorized to receive the virtual machine (operation 311). In an event that no such authorization is found, control reverts to operation 310 whereupon the processing unit 161 continues running the host operating system 17.

In accordance with embodiments, such authorization could take the form of media access control (MAC) authorization or some other form of authentication action. As examples, the authentication actions could relate to access list checks on the virtual machine or operating system provisioning server 19 or a user/password token exchange between the virtual machine or operating system provisioning server 19 and the mobile computing device 16.

In accordance with embodiments and, as shown in FIG. 3, control may revert to operation 311 in an event that operation 306 reveals that a virtual machine or operating system instance provisioning server 19 is found or that any version of the virtual machine on a virtual machine or operating system instance provisioning server 19 is a later version than the version of the virtual machine of the instance 18. In any case, in an event that operation 311 reveals that the mobile computing device 16 is MAC authorized, the method includes a halting of a usage of a current profile by the processing unit 161 and a checking of the trusted bios or the firmware 163 for instructions on how to handle or otherwise process the stopping of the running of the instance 18 of the virtual machine (operation 312). As above, in accordance with embodiments, these instructions may refer to storing and encrypting the instance 18 or the destruction of the instance 18.

Next, the method includes a live migration to the virtual machine of the virtual machine or operating system instance provisioning server 19, a virtual machine or operating system instance provisioning boot of the new virtual machine on the mobile computing device (i.e., a remote running of the virtual machine) 16 or an installation or an updating of the virtual machine on the firmware 163 to permit a local running of the instance 18 of the virtual machine (operation 313). Operation 312 continues until the mobile computing device 16 is out of the range of the beacon signal 15 or approaches the range limit such that strength of the beacon signal 15 is reduced below the predefined threshold.

As described above, embodiments relate to the notion of the mobile computing device 16 being able to run the instance 18 of the virtual machine within the host operating system 17 as long as the beacon signal 15 of a predefined strength is received. Since this beacon signal 15 is in effect only broadcast with a predefined range that may be, but is not required to be, limited to the portion of the campus 11 to which the network 13 is broadcasted, the instance 18 of the virtual machine can effectively only be run by the mobile computing device 16 on the campus 11. However, in accordance with additional or alternative embodiments, the instance 18 of the virtual machine will be run on the mobile computing device 16 only as long as the beacon signal 15 is of a predefined strength and a user of the mobile computing device 16 may be alerted to this fact as he approaches a periphery of the range of the beacon signal.

Figure 4:
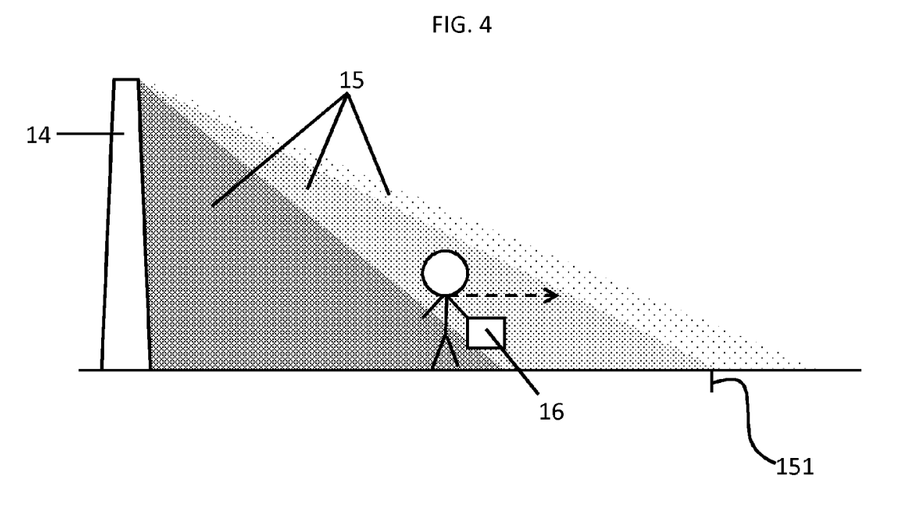
FIG. 4 is a schematic diagram of a mobile computing device user approaching a periphery of a beacon signal range.

For example, with reference to FIG. 4, as a user of the mobile computing device 16 approaches the periphery of the range of the beacon signal 15, the strength of the beacon signal 15 decreases as illustrated by the decreased shading. Then, once the user passes point 151 and the beacon signal 15 is finally reduced, the firmware 163 will automatically terminate the running of the instance 18 of the virtual machine with a possible warning to the user given in response to geo-location data or a signal strength reduction rate.

Technical effects and benefits of some embodiments include a system that is provided that makes it unlikely for a user to "forget" to log out of a virtual machine profile when switching roles. The system allows for management and installation of multiple virtual machines with respect to devices within various networks as well as automatic or semi-automatic switching of these virtual machines based upon when a user comes in range of a beacon relating to a particular virtual machine that is to be run on his device. In accordance with and embodiment of the system, as the user's distance from the beacon increases, the device will begin to switch back to the device's original operating system or virtual machine. In order to limit access to these location-based virtual machines, the system uses mobile device firmware to passively scan for a signal beacon (e.g., a wifi, a GPS signal or another broadcast system) that uses the presence or absence of this signal and possibly the signal strength to ensure a user is within the network region considered appropriate for that role.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a broadcasting device configured to emit a beacon signal to which a virtual machine is associated over a predefined positional range from the broadcasting device; and
a mobile computing device comprising:
a networking unit which is receptive of the beacon signal when the mobile device is within the predefined positional range;
a memory having firmware and computer readable instructions residing on the firmware; and
one or more processors for executing the computer readable instructions, the computer readable instructions being configured to instruct the one or more processors to run a host operating system at any location, determine whether the mobile computing device is within the predefined positional range based on a strength of the beacon signal received by the networking unit being above a predefined strength and run an instance of the virtual machine within the host operating system using a component of the beacon signal only when the mobile computing device is determined to be within the predefined positional range, and
the firmware being configured to terminate the running of the instance of the virtual machine when the mobile computing device is determined to be outside of the predefined positional range based on the strength of the beacon signal received by the networking unit being below the predefined strength.

2. The system according to claim 1, wherein the component of the beacon signal comprises a decryption element by which the running of the instance of the virtual machine is initiated.

3. The system according to claim 1, further comprising a virtual machine or operating system instance provisioning server disposed within the predefined positional range.

4. The system according to claim 3, wherein the mobile computing device comprises firmware on which the operating system and the virtual machine reside.

5. The system according to claim 4, wherein the mobile computing device updates the virtual machine from the virtual machine or operating system instance provisioning server.

6. The system according to claim 4, wherein the mobile computing device installs the virtual machine from the virtual machine or operating system instance provisioning server.

7. The system according to claim 4, wherein the mobile computing device runs the virtual machine on the virtual machine or operating system instance provisioning server.

8. The system according to claim 1, wherein the computer readable instructions are further configured to instruct the one or more processors to:
determine whether the mobile computing device is at a periphery of the predefined positional range from the strength of the beacon signal received by the networking unit being reduced toward the predefined strength; and
alerting a user of the mobile computing device that the user is at the periphery of the predefined positional range.

9. A mobile computing device usable with a broadcasted network, the broadcasted network including a broadcasting device emitting a beacon signal associated with a virtual machine, the mobile computing device comprising:
a networking unit receptive of the beacon signal when the mobile computing device is in a broadcast range of the broadcasting device;
a processing unit coupled to the networking unit;
a memory unit having executable instructions stored thereon, which, when executed, cause the processing unit to run a host operating system, determine whether the mobile computing device is within the broadcast range based on a strength of the beacon signal received by the networking unit being above a predefined strength and run an instance of the virtual machine within the host operating system using a component of the beacon signal only when the mobile computing device is determined to be within the broadcast range; and
firmware on which the operating system and the virtual machine reside, the firmware being configured to terminate the running of the instance of the virtual machine when the mobile computing device is determined to be outside of the broadcast range based on the strength of the beacon signal received by the networking unit being below the predefined strength.

10. The mobile computing device according to claim 9, wherein, when executed, the executable instructions cause the processing unit to install or update the virtual machine on the firmware.

11. The mobile computing device according to claim 9, further comprising data storable remotely from the mobile computing device or on the memory unit to indicate that the mobile computing device is authorized to run the instance of the virtual machine.

12. The mobile computing device according to claim 9, wherein, when executed, the executable instructions cause the processing unit to run the instance of the virtual machine locally or remotely.

* * * * *